United States Patent
Sarrigeorgidis

(10) Patent No.: US 8,077,805 B1
(45) Date of Patent: Dec. 13, 2011

(54) MIMO EQUALIZER METHOD AND APPARATUS

(75) Inventor: Konstantinos Sarrigeorgidis, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 800 days.

(21) Appl. No.: 12/111,029

(22) Filed: Apr. 28, 2008

Related U.S. Application Data

(60) Provisional application No. 60/943,394, filed on Jun. 12, 2007, provisional application No. 60/914,543, filed on Apr. 27, 2007.

(51) Int. Cl.
H04L 27/00 (2006.01)

(52) U.S. Cl. ......................................... 375/316

(58) Field of Classification Search ................... 375/142, 375/143, 144, 148, 150, 152, 267, 299, 316, 375/343, 346, 347, 349; 455/63.1, 114.2, 455/278.1, 296, 101, 132–141; 700/53
See application file for complete search history.

(56) References Cited

U.S. PATENT DOCUMENTS

| 2007/0165737 A1 | 7/2007 | Sarrigeorgidis | |
| 2007/0253476 A1* | 11/2007 | Tirkkonen et al. | 375/230 |

FOREIGN PATENT DOCUMENTS

| WO | WO 2006/106171 | * 10/2006 |
| WO | WO 2007/035993 | 4/2007 |

OTHER PUBLICATIONS

S. A. Mujtaba, "IEEE P802.11—Wireless LANS, TGn Sync Proposal Technical Specification," doc.: IEEE 802.11—04/0889r6, May 2005.

IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ, IEEE Std. 802.16a 2003, Apr. 1, 2003.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: High-speed Physical Layer in the 5 GHZ Band," IEEE Std. 802.11a, 1999.

"Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher-Speed Physical Layer Extension in the 2.4 GHz Band," IEEE Std. 802.11g/D2.8, May 2002.

Gene H. Golub & Charles F. Van Loan, *Matrix Computations*, The John Hopkins University Press, pp. 24-54, 69-80, 87-123, 174-183, 197-205, 256-265 (3d ed. 1996).

Cormen et al., *Introduction to Algorithms*, McGraw-Hill, pp. 755-759 (2d ed. 2001), also available at http://serverbob.3x.ro/IA/DDU0179.html.

* cited by examiner

Primary Examiner — Sam K Ahn

(57) ABSTRACT

A training signal is received, and a channel estimate matrix is determined based on the received training signal. The channel estimate matrix is partitioned into a plurality of block matrices, wherein at least one of the block matrices has at least one dimension greater than one. Additionally, a multiple input, multiple output (MIMO) equalizer is calculated based on a block matrix inverse or pseudo-inverse of the partitioned channel estimate matrix, and the MIMO equalizer is applied to data signals.

20 Claims, 8 Drawing Sheets

MIMO EQUALIZER METHOD AND APPARATUS

CROSS-REFERENCES TO RELATED APPLICATIONS

The present application claims the benefit of U.S. Provisional Application No. 60/914,543, entitled "A New Architecture for a 3X3 EWC MIMO Equalizer," filed on Apr. 27, 2007, which is hereby incorporated by reference herein in its entirety.

The present application also claims the benefit of U.S. Provisional Application No. 60/943,394, entitled "A New Architecture for a 3X3 EWC MIMO Equalizer," filed on Jun. 12, 2007, which is hereby incorporated by reference herein in its entirety.

FIELD OF TECHNOLOGY

The present disclosure relates generally to wireless communication systems and, more particularly, to an apparatus and method for computing and/or applying an equalizer matrix for a multiple-input, multiple-output wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technology is described in detail in the 802.11 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

Additionally, each receiver of the wireless communication system may periodically develop an equalizer matrix that, when applied to the received signal, attempts to reverse the effects of the channel. Developing the equalizer matrix may include developing an estimate of the channel, and then using the estimate of the channel to generate the equalizer coefficients. Channel estimation may involve transmitting known training symbols, receiving the transmitted training symbols, and processing the received training symbols to estimate the channel. The estimation may be based on differences between the known training symbols and the received training symbols. In OFDM system, there may be multiple equalizer matrices, each for a different OFDM sub-band.

SUMMARY

In one embodiment, a method includes receiving a training signal, and determining a channel estimate matrix based on the received training signal. The method also includes partitioning the channel estimate matrix into a plurality of block matrices, wherein at least one of the block matrices has at least one dimension greater than one. Additionally, the method includes calculating a multiple input, multiple output (MIMO) equalizer based on a block matrix inverse or pseudo-inverse of the partitioned channel estimate matrix, and applying the MIMO equalizer to data signals.

In another embodiment, an apparatus for a multiple input, multiple output (MIMO) receiver comprises a matrix equalizer. The matrix equalizer is configured to determine a channel estimate matrix based on a training signal, and partition the channel estimate matrix into a plurality of block matrices, wherein at least one of the block matrices has at least one dimension greater than one. The matrix equalizer also is configured to calculate a MIMO equalizer based on a block matrix inverse or pseudo-inverse of the partitioned channel estimate matrix, and apply the MIMO equalizer to data signals.

In yet another embodiment, a method of wirelessly receiving signals in a multiple input, multiple output (MIMO) communication system having a receiver with a plurality of receive antennas and a transmitter with a plurality of transmit antennas is disclosed. The method includes receiving a training signal, and demodulating the training signal to produce a demodulated training signal. Additionally, the method includes determining a channel estimate matrix based on the demodulated training signal, and partitioning the channel estimate matrix into a plurality of block matrices, wherein at least one of the block matrices has at least one dimension greater than one. Also, the method includes calculating a MIMO equalizer based on a block matrix inverse or pseudo-inverse of the partitioned channel estimate matrix. The method further includes receiving a data signal, and demodulating the data signal to produce a demodulated data signal. Still further, the method includes applying the MIMO equalizer to the demodulated data signal to produce an equalized data signal, and decoding the equalized data signal.

In yet another embodiment, a wireless receiver for receiving signals in a multiple input, multiple output (MIMO) communication system comprises a plurality of receive antennas, and a signal demodulator coupled to the plurality of receive antennas and adapted to demodulate signals received via the plurality of receive antennas to produce a demodulated signal. The wireless receiver also comprises a matrix equalizer coupled to the signal demodulator to generate an equalized signal, and a decoder coupled to the matrix equalizer and adapted to decode the equalized signal. The matrix equalizer is configured to determine a channel estimate matrix based on a demodulated training signal, and partition the channel estimate matrix into a plurality of block matrices, wherein at least one of the block matrices has at least one dimension greater than one. The matrix equalizer is additionally configured to calculate a MIMO equalizer based on a block matrix inverse or pseudo-inverse of the partitioned channel estimate matrix.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
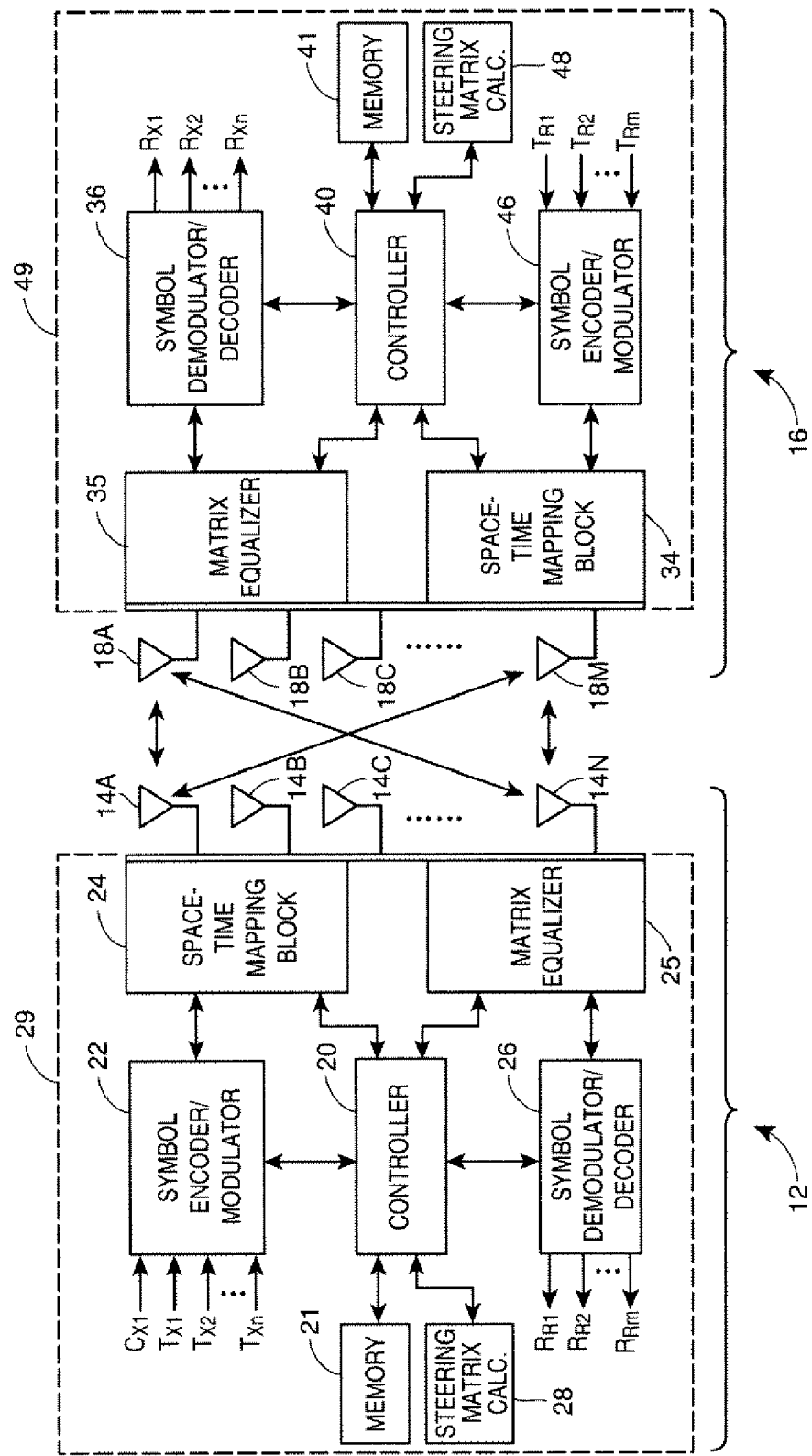
FIG. 1 is a block diagram of a wireless MIMO communication or transmission system that implements a MIMO equalizer.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 12 may be any desired type of controller and both the controller 12 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the space-time mapping block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be a sounding packet, one or more fields in a preamble, etc.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 20, to thereby perform beamsteering or beamforming via the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (e.g., sounding packet, preamble fields, etc.). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

More particularly, the matrix equalizer 35 may process the test or control signal $C_{x1}$ to develop an equalizer matrix that, when applied to the received signal, attempts to reverse the effects of the channel. The channel may be represented as H, an $N_{Rx} \times N_{Tx}$ matrix, where $N_{Rx}$ is a number of receive antennas and $N_{Tx}$ is a number of transmit antennas. As will be described in more detail below, the matrix equalizer 35 may develop an inverse or a pseudo inverse of H, i.e., $H^{-1}$ or $H^{+}$, respectively, which can be applied by the matrix equalizer 35 to the received signal. In an OFDM system, there may be a plurality of channel matrices $H_k$, where k is a sub-carrier index, and the matrix equalizer 35 may develop a plurality of inverses $H^{-1}_k$ or pseudo-inverses $H^{+}_k$. Developing the inverse or pseudo-inverse of each of the channel matrices $H_k$ generally involves applying the same processes for each sub-carrier. Thus, for ease of explanation, the subscript k will not be used in the description that follows.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may develop an inverse or pseudo inverse of the channel matrix, which can be applied by the matrix equalizer 25 to enhance the separation and therefore the reception of the various signals transmitted by the antennas 18A-18M. Of course, the CSI for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40, and channel estimates or channel pseudo-inverses used by the equalizers 25,35 may be stored in the memories 21 and 41.

As is generally known, beamforming or beamsteering typically includes applying appropriate phases and gains to the various signals as sent through the multiple transmitter antennas 14A-14N, in a manner with causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16 but may instead be developed from signals sent from the receiver 16 to the transmitter 12 in the reverse link as an estimate of the forward link).

It will be understood that beamforming is an optional technique, and thus one or more of the space-time mapping block 24, the steering matrix calculator 28, the space-time mapping block 34, or the steering matrix calculator 48 may be omitted.

According to the IEEE 802.11n specification, a transmitter, such as the transmitter 12, periodically generates a plurality of long training fields (LTFs), each LTF including a plurality of training symbols. The transmitter then multiplies each training symbol by a corresponding column of a preamble steering matrix P. A number of rows of the matrix P corresponds with the number of transmit antennas $N_{Tx}$. A number of columns of the matrix P corresponds with a number of LTFs. Matrix P improves the orthogonality of the training symbols 20 as they are transmitted from the different transmit antennas.

A receiver, such as the receiver 16, receives the training symbols via the multiple receive antennas. As will be described in more detail below, the receiver generates equalizer coefficients based on the received LTFs.

Figure 2:
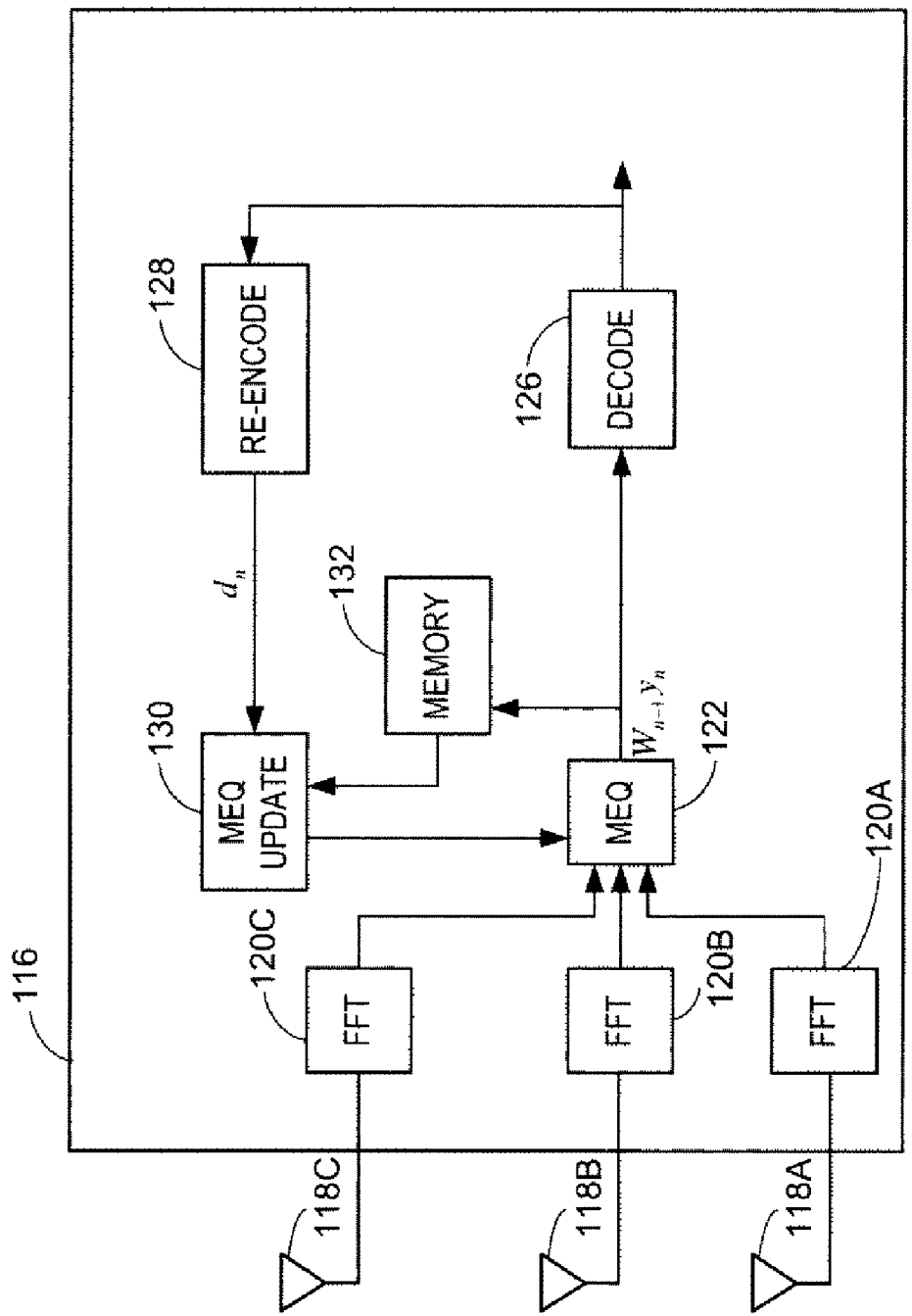
FIG. 2 is a block diagram of an example receiver that implements a MIMO equalizer.

FIG. 2 is a block diagram of another example receiver 116 that generates equalizer coefficients based on the received LTFs. The receiver 116 includes three receiver antennas 118A-118C to receive OFDM/MIMO signals transmitted from a transmitter (not shown). Generally speaking, the receiver 116 may receive a plurality of streams from a single MIMO transmitter. Although three receive antennas 118 are illustrated in FIG. 2, it will be understood that different numbers of antennas may be utilized, such as 2, 4, 5, 6, etc. The receiver 116 includes Fast Fourier Transform (FFT) blocks 120A, 120B, 120C, where an FFT block may be provided for each receiving antenna 118A, 118B, 118C. Thus, although three FFT blocks 120 are illustrated in FIG. 2, there may be different numbers of FFT blocks such as 2, 4, 5, 6, etc. Alternatively, two or more of the receiving antennas 118A-118C may be coupled to the same FFT block. Thus, although three FFT blocks 120 are illustrated in FIG. 2, there may be different numbers of FFT blocks such as 1, 2, 4, 5, 6, etc.

The received data streams may be received from the Fast Fourier Transform (FFT) blocks 120 directly or indirectly. In any case, the outputs from the FFT blocks 120 are provided to a matrix equalizer block (MEQ) 122. Generally speaking, the MEQ 122 may generate an equalizer matrix using techniques such as described herein. Additionally, the MEQ 122 may apply the equalizer matrix to the received signal, which may be designated at $y_n$, where n may be an OFDM symbol index. The MEQ 122 applies an equalization matrix, $W_{n-1}$, which is generally an inverse or pseudo-inverse (at least approximately) of the channel matrix, H, to the received signal, $y_n$, to attempt recover the original signal, which may be designated as $x_n$. The signal generated by applying the matrix equalizer $W_{n-1}$, to the received signal $y_n$ may be referred to as an equalized vector $\hat{x}_n$. The applied equalization matrix $W_{n-1}$ has a subscript n−1 to indicate that the equalization matrix has not yet been updated based on the current received signal $y_n$.

In one example using OFDM with QAM modulation, the MEQ 122 may include a QAM slicer that "slices" the input from the FFT block(s) 120 to obtain the nearest data vector (or symbol in the case of OFDM) in the received data transmission, and outputs hard decisions to obtain the nearest constellation point. Optionally, the QAM slicer may be external to the MEQ 122. The output of the slicer may be provided to a As will be understood from the description below, an initial value of the equalization matrix W may be computed based on an inverse or pseudo-inverse of an estimate of the channel matrix, H, and then updated as symbols or signals $y_n$ are received. As a result, the time index of the equalization matrix $W_{n-1}$, generally lags the received signal $y_n$ to which it is applied, such that the equalization matrix, $W_{n-1}$, is the inverse or pseudo-inverse (at least approximately) of the channel matrix, H, corresponding to a previous received vector $y_{n-1}$. However, it is contemplated that once the initial equalization matrix is computed based on an estimate of the channel matrix H, the equalization matrix, W, may be updated for every vector, $y_n$, or received symbol, thereby tracking changes in the channel that may occur during a packet, for example.

An output of the MEQ 122 is the equalized vector, $\hat{x}_n$. In other words, the equalized vector, $\hat{x}_n$, is an equalized representation of the received signal $y_n$. The equalized vector, may thereby be represented according to the following equation:

$$\hat{x} = W_{n-1} y_n \quad \text{(Equation 1)}$$

The equalized vector $\hat{x}_n$ may be stored in a memory 132.

An output of the slicer may be applied to a decoder 126. In one example, the decoder 126 is a Viterbi decoder that implements spatial de-parsing, de-interleaving and depuncturing of the equalized signal. Generally speaking, the Viterbi decoder 126 uses the Viterbi algorithm for decoding data vectors that have been encoded using forward error correction (FEQ), and is useful for detecting and/or correcting errors in the MEQ 122 output. Errors at the MEQ 122 output generally tend to increase when the number of signal streams, $N_{ss}$ is larger than one due to high QAM symbol errors resulting from channel conditions, such that the decisions from the MEQ 122 are not always reliable. In order to account for these errors, the Viterbi decoder has been found to be particularly useful for maximum likelihood decoding. The Viterbi decoder generates a decoded output.

The output of the decoder 126 is re-encoded and re-modulated at a re-encoder 128. The output from the re-encoder 128, $d_n$, is then an error-corrected version of the encoded equalized vector, $\hat{x}_n$, or, to put it otherwise, a best estimation of the encoded data that was sent from the transmitter. The re-encoded data, $d_n$, is then provided to a equalization matrix (MEQ) update unit 130, which uses the re-encoded data, $d_n$, as training data for determining changes in the equalizer matrix. In particular, the MEQ update unit 130 compares the re-encoded data, $d_n$, to the equalized representation of the data vector, $\hat{x}_n$. This comparison is generally used to generate an incremental adjustment to the equalizer matrix W.

Because the equalized vector, $\hat{x}_n$, is assumed to be error-prone versus the re-encoded data, $d_n$, which is generally assumed to be error-free or at least have minimal errors, the MEQ update unit 130 is able to track the changes in the channel by comparing data affected by the channel and also equalized to data unaffected by the channel thereby monitoring changes in the channel and to adapt the equalization matrix, W, to those changes. For example, the MEQ update unit 130 may generate an error vector based on the comparison of the equalized vector, $\hat{x}_n$, and the re-encoded data, $d_n$. Using the error vector, the MEQ update unit 130 may further utilize update or adaptation rules, such as least-mean-squares (LMS) or recursive-least-squares (RLS), to generate an update to the equalization matrix.

In another implementation, the adaptive update of the equalization matrix can be based on the output of the slicer and the equalized vector $\hat{x}_n$. In such an implementation, the re-encoder 128 may be omitted.

More generally, the MEQ update unit 130 may update the equalization matrix in a variety of manners. In one example, the MEQ update unit 130 may directly update the equalization matrix using LMS adaptation, RMS adaptation, etc., each approach having different degrees of complexity and, as a result, different computational costs.

In another implementation, channel tracking features may not be utilized. In such an implementation, the blocks 128, 130 and 132 may be omitted.

Figure 3:
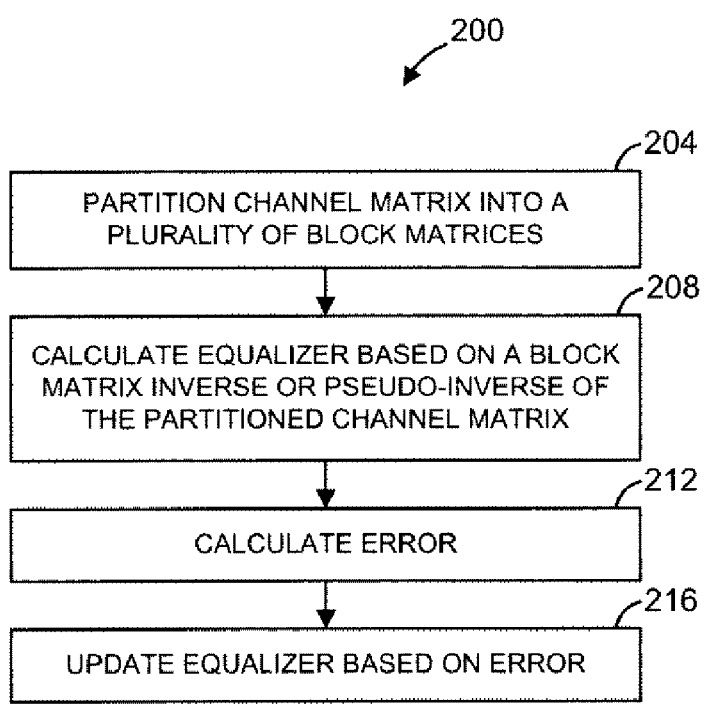
FIG. 3 is a flow diagram of an example method for calculating a MIMO equalizer.

As discussed above, the MEQ 122 generates the equalization matrix W based on an inverse or pseudo-inverse of a channel estimate matrix, H. Also, the MEQ 122 optionally updates the equalization matrix W as data is received to adjust the equalizer as the channel may change over time. FIG. 3 is a flow diagram of an example method 200 for calculating a MIMO equalizer (e.g., an equalization matrix W). The method 200 assumes that a channel estimate matrix H has been generated. The channel estimate matrix H may be generated in any of a variety of ways, including ways currently known to those of ordinary skill in the art. As just one example, in systems compliant with the 802.11 a/g/n Standards, the channel estimate matrix H may be generated based on the receipt of LTFs.

The method 200 may be implemented by the matrix equalizer 25 (FIG. 1), the matrix equalizer 35 (FIG. 1), and/or the MEQ 122 (FIG. 2), for example. It will be understood, however, that the method 200 may be implemented by transceivers or receivers other than those illustrated in FIGS. 1 and 2.

At a block 204, the channel estimate matrix H is partitioned into a plurality of block matrices, wherein at least one of the block matrices has a dimension of at least two (i.e., has at least two columns and/or at least two rows). On the other hand, the other block matrices may include any combination of scalars (first and second dimensions are both one), vectors (i.e., a first dimension of one and a second dimension of at least two), or matrices (i.e., a first dimension of a least two and a second dimension of at least two). For example, the channel estimate matrix may be partitioned as:

$$H = [A \ B] \quad \text{(Equation 2)}$$

or $$H = \begin{bmatrix} A & B \\ C & D \end{bmatrix} \quad \text{(Equation 3)}$$

where A, B, C and D are block matrices.

At a block 208, an equalizer is calculated based on a block matrix inverse or pseudo-inverse of the partitioned channel estimate matrix. An equalized vector may be expressed as:

$$\hat{x} = W_{ii} H^+ y = W_{ii} W_y \quad \text{(Equation 4)}$$

or $$\hat{x} = W_{ii} H^{-1} y = W_{ii} W_y \quad \text{(Equation 5)}$$

where y represents received data symbols, W is a matrix equalizer, $W_{ii}$ is a diagonal matrix in which each diagonal coefficient is a norm of a corresponding row in W, H represents the channel estimate, $H^+$ is a pseudo-inverse of H, $H^{-1}$ is an inverse of H, and $\hat{x}$ represents received data symbols for which the equalizer has been applied. As can be seen in Equations 4 and 5, W may be $H^+$ or $H^{-1}$, and thus the equalizer may be calculated based on $H^+$ or $H^{-1}$. $H^+$ or $H^{-1}$ may be calculated using any of a variety of block matrix inverse or pseudo-inverse techniques.

At a block 212, an error associated with the equalized vector $\hat{x}$ as compared with actually transmitted data symbols x may be calculated. For example, in an OFDM based system such as with the IEEE 802.11 a/g/n Standards, the equalized vector $\hat{x}$ may be provided to a QAM slicer. The error may be generated based on a comparison of $\hat{x}$ and decisions of the QAM slicer. Also in OFDM based system that utilize a Viterbi decoder such as with the IEEE 802.11 a/g/n Standards, outputs of the Viterbi decoder may be re-encoded and re-modulated, and the error maybe generated base on a comparison of the equalized vector with the re-encoded and re-modulated Viterbi decoder output. An error may be generated multiple times during reception of a packet. For example, an error may be generated for each data symbol that is received. In an implementation corresponding to the example receiver 116 of FIG. 2, an error may be generated as:

$$e = d_n - W_{n-1} y_n \quad \text{(Equation 6)}$$

At a block 216, the equalizer W may be updated based on the error generated at the block 312 using an iterative adaptation technique. For example, W may be updated using an LMS technique:

$$W_n = W_{n-1} + \mu e y^*_n \quad \text{(Equation 7)}$$

wherein e is the error generated at the block 212, and $\mu$ is an adaptation parameter (a step size parameter) that may be chosen based on the particular implementation. Thus, the blocks 212 may be repeated, for example, as symbols in a packet are being received, so that the equalizer adjusts to changing conditions of the channel that occur during transmission of the packet. Adjusting the equalizer during reception of a packet to account for changes of the channel during transmission of the packet may be referred to as channel tracking. If channel tracking is not desired, the blocks 212 and 216 may be omitted.

Figure 4:
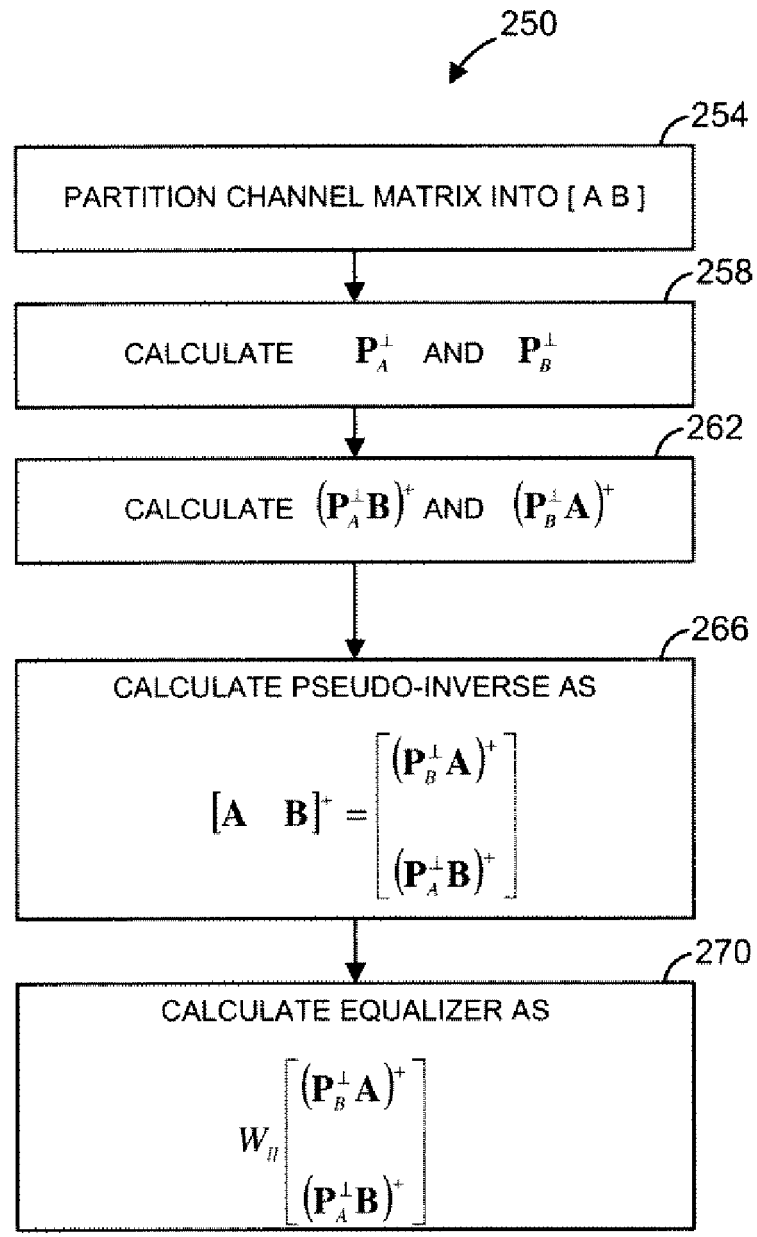
FIG. 4 is a flow diagram of one example method for implementing a portion of the method of FIG. 3.

As discussed above with respect to the block 204, the channel estimate matrix H may be partitioned into a plurality of block matrices. As just one example, the channel estimate matrix H may be partitioned into two block matrices A and B (Equation 2), wherein each of the matrices A and B has at least two rows, and wherein each of the matrices has less columns than rows. FIG. 4 is a flow diagram of an example method 250 for implementing the blocks 204 and 208 of FIG. 3 when the channel estimate matrix H can be partitioned in accordance with Equation 2. Of course, it will be understood by those of ordinary skill in the art that the blocks 204 and 208 of FIG. 3 may be implemented in ways other than the example method 250, including when matrix H can be partitioned in accordance with Equation 2.

For the example method 250, the equalizer may be expressed as:

$$W = W_{ii} H^+ \quad \text{(Equation 8)}$$

At a block 254, the channel estimate matrix may be partitioned according to equation 2. At a block 258, orthogonal projection matrices $P_A^\perp$ and $P_B^\perp$ may be calculated as:

$$P_A^\perp = I - A(A^T A)^{-1} A^T \quad \text{(Equation 9)}$$

$$P_B^\perp = I - B(B^T B)^{-1} B^T \quad \text{(Equation 10)}$$

Then, at a block 262, matrices $P_A^{-1} B$ and $P_B^{-1} A$ may be calculated, and the pseudo-inverses $(P_A^{-1} B)^+$ and $(P_B^{-1} A)^+$ may be calculated.

At a block 262, the pseudo-inverse of H may be calculated based on the pseudo-inverses $(P_A^{-1} B)^+$ and $(P_B^{-1} A)^+$:

$$H^+ = \begin{bmatrix} (P_B^\perp A)^+ \\ (P_A^\perp B)^+ \end{bmatrix} \quad \text{(Equation 11)}$$

Finally, at a block 270, the matrix $W_{ii}$ may be calculated; and the equalizer may be calculated as:

$$W = W_{ii} \begin{bmatrix} (P_B^\perp A)^+ \\ (P_A^\perp B)^+ \end{bmatrix} \quad \text{(Equation 12)}$$

Optionally, the matrices $W_{ii}$ and $H^+$ may be applied separately by the equalizer. In such implementations, the matrices $W_{ii}$ and $H^+$ need not be combined as set forth in Equation 12.

In one particular implementation of the method 250 of FIG. 4, in which the channel matrix H is a 3×2 matrix (i.e., three receive antennas and two transmit antennas), the matrix H may be partitioned as:

$$H = [a\ b] \quad \text{(Equation 13)}$$

where a and b are 3×1 vectors. In such an implementation, the equalizer may be calculated at:

$$W = W_{ii} H^+ = (1/(H^* H)^{-1})_{ii} H^+ = \begin{bmatrix} \overline{a} - \dfrac{\overline{b}}{\|b\|^2} c \\ \overline{b} - \dfrac{\overline{a}}{\|a\|^2} c \end{bmatrix} \quad \text{(Equation 14)}$$

where $c = b^* a$ and $(1/(H^* H)^{-1})_{ii}$ is a diagonal matrix of sub-stream SNRs; $(1/(H^* H)^{-1})_{ii}$ need not be explicitly calculated.

As discussed above with respect to the block 204 of FIG. 3, the channel estimate matrix H may be partitioned into, as another example, block matrices A, B, C and D (Equation 3). In one embodiment, the matrix A has at least two rows and at least two columns. When the channel estimate matrix H is partitioned as in Equation 3, the inverse of H can be calculated as:

$$H^{-1} = \begin{bmatrix} A & B \\ C & D \end{bmatrix}^{-1} = \begin{bmatrix} A^{-1} + A^{-1} B S_A^{-1} C A^{-1} & -A^{-1} B S_A^{-1} \\ -S_A^{-1} C A^{-1} & S_A^{-1} \end{bmatrix} \quad \text{(Equation 15)}$$

where $S_A$ is known as the Schur complement of A:

$$S_A = D - C A^{-1} B \quad \text{(Equation 16)}$$

Thus, the equalizer matrix can be calculated based on Equation 15 and Equation 16.

In the IEEE 802.11n Standard, when there are three transmit antennas and three receive antennas, the channel estimate matrix may be expressed as:

$$H = [H_{ltf1:3}\ h_{ltf4}] \cdot P^\perp = [H_{ltf1:3}\ h_{ltf4}] \cdot \begin{bmatrix} P_1 \\ p \end{bmatrix} \quad \text{(Equation 17)}$$

where $H_{ltf1:3}$ is a 3×3 matrix in which the first column corresponds to a channel estimate calculated in response to receiving a first high throughput LTF (HT-LTF) transmitted from a transmitter, the second column corresponds to a channel estimate calculated in response to receiving a second HT-LTF, and the third column corresponds to a channel estimate calculated in response to receiving a third HT-LTF; where $h_{ltf4}$ is a 3×1 vector that corresponds to a channel estimate calculated in response to receiving a fourth HT-LTF; where $P^\perp$ is a 4×3 matrix corresponding to the preamble steering matrix P; where the superscript $^\perp$ indicates a pseudoinverse operator[; and where:

$$P_1 = \begin{bmatrix} 1 & -1 & 1 \\ 1 & 1 & -1 \\ 1 & 1 & 1 \end{bmatrix} \quad \text{(Equation 18)}$$

and $$p = \begin{bmatrix} 1 & -1 & -1 \end{bmatrix} \quad \text{(Equation 19)}$$

If $W_{ltf}$ is defined as:

$$W_{ltf} = H_{ltf1:3}^{-1} \quad \text{(Equation 20)}$$

then the equalizer can be expressed as:

$$W_{ii}P_1^{-1}(W_{ltf}-k \cdot u \cdot w) = W_{ii}P_1^{-1}(W_{ltf}+\Delta W) = W_{ii} \cdot W \quad \text{(Equation 21)}$$

where:

$$P_1^{-1} = 2\begin{bmatrix} 1 & -1 & 0 \\ 1 & 0 & -1 \\ 0 & 1 & 1 \end{bmatrix} \quad \text{(Equation 22)}$$

$$k = 1/(1 = p\underline{u}) \quad \text{(Equation 23)}$$

$$\underline{u} = W_{ltf}h_4 \quad \text{(Equation 24)}$$

$$w = pW_{ltf} \quad \text{(Equation 25)}$$

$$\Delta W = -k \cdot u \cdot w \quad \text{(Equation 26)}$$

Figure 5:
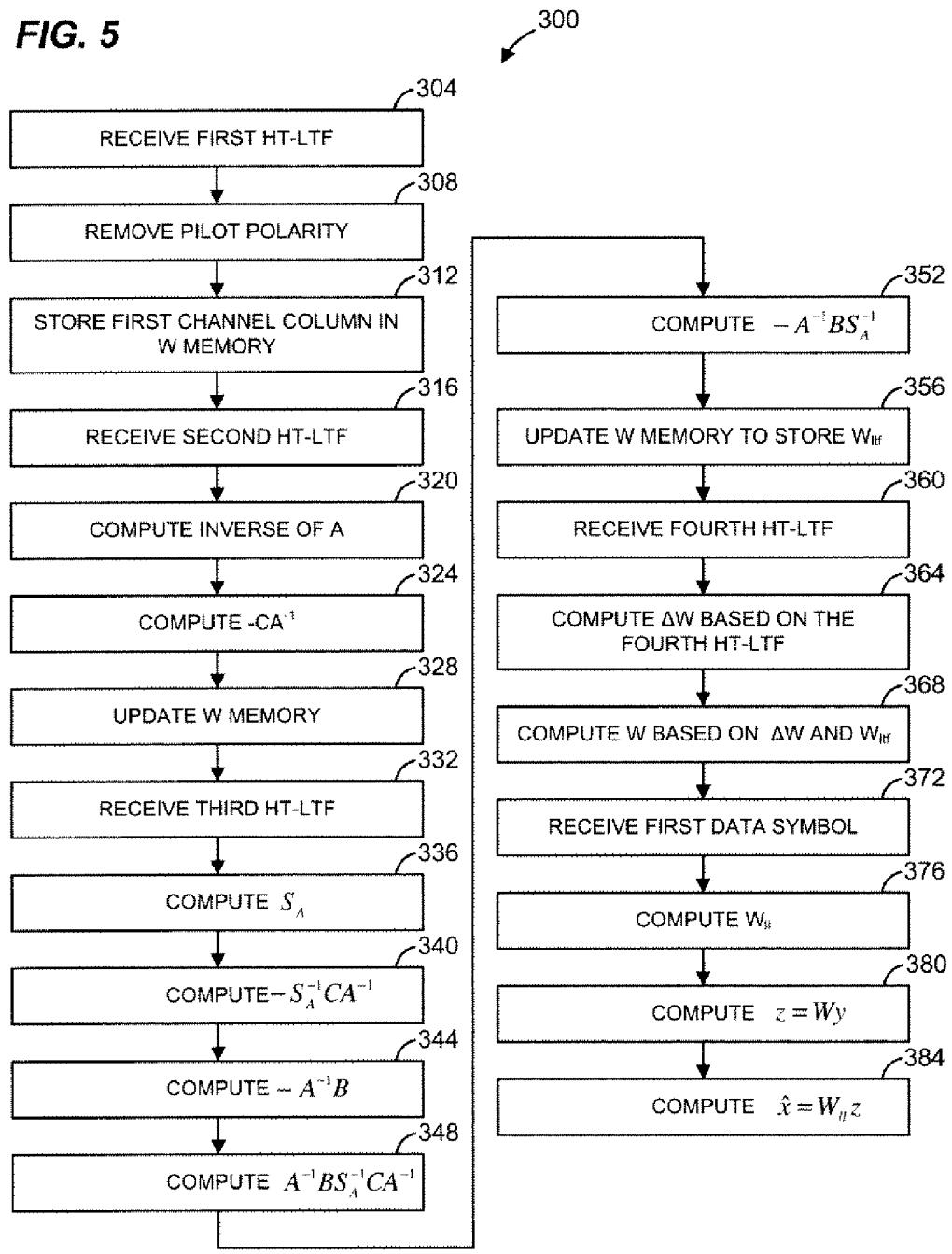
FIG. 5 is a flow diagram of an example method for calculating a MIMO equalizer and applying the equalizer in a receiver compliant with the IEEE 802.11n Standard.

FIG. 5 is a flow diagram of an example method 300 for calculating a MIMO equalizer and applying the equalizer. Portions of the method 300 may be utilized to implement the blocks 204 and 208 of FIG. 3 when the channel estimate matrix H can be partitioned in accordance with Equation 3. More specifically, the method 300 may be utilized for generating an equalizer compliant with the IEEE 802.11n Standard when there are three transmit antennas, three receive antennas, and three spatial streams. Of course, it will be understood by those of ordinary skill in the art that the blocks 204 and 208 of FIG. 3 may be implemented in ways other than the example method 300, including when matrix H can be partitioned in accordance with Equation 3.

In the method 300, the matrix $H_{ltf1:3}$ will be partitioned as in Equation 3. Thus, the block matrix A is a 2×2 matrix; the block matrix B is a 2×1 vector; the block matrix C is a 1×2 vector; and the block matrix D is a scalar. Thus, the inverse of $H_{ltf1:3}$ can be calculated according to Equation 15 and Equation 16. Additionally, each column of $H_{ltf1:3}$ may be computed upon receiving a corresponding HT-LTF.

At a block 304, the first HT-LTF is received, and at a block 308, pilot polarity of the received first HT-LTF is removed. At a block 312, the resulting first column of $H_{ltf1:3}$ is stored in a memory (which may be referred to as a W memory). The W memory may be included in a matrix equalizer block such as the blocks 25, 35 of FIG. 1 and/or the MEQ 122 of FIG. 2.

After the second HT-LTF has been received (block 316), $A^{-1}$ can be calculated at a block 320 based on the first column of $H_{ltf1:3}$ stored in the W memory and the second HT-LTF. Additionally, at a block 324, the value $-CA^{-1}$ can be calculated based on $A^{-1}$ calculated at the block 320, and based on the first column of $H_{ltf1:3}$ stored in the W memory and the second HT-LTF. At a block 328, the W memory may be updated to store the following values:

$$W_{mem} = \begin{bmatrix} A^{-1} & -A^{-1} \\ -CA^{-1} & 0 \end{bmatrix}$$

After the third HT-LTF has been received (block 332), $S_A$ can be calculated at a block 336 according to Equation 16, utilizing the third HT-LTF and the value $-CA^{-1}$ stored in the W memory. Similarly, at a block 340, the value $-S_A CA^{-1}$ can be calculated. Also, at a block 344, a value $-A^{-1}B$ can be calculated. At a block 348, a value $A^{-1}BS_A^{-1}CA^{-1}$ can be calculated; and at a block 352 a value $-A^{-1}BS_A^{-1}$ can be calculated. At a block 356, the W memory may be updated to store the following values:

$$W_{mem} = \begin{bmatrix} A^{-1} + A^{-1}BS_A^{-1}CA^{-1} & -A^{-1}BS_A^{-1} \\ -S_A^{-1}CA^{-1} & S_A^{-1} \end{bmatrix} = W_{ltf}$$

In other words, after the block 356, the W memory stores the inverse of $H_{ltf1:3}$.

After the fourth HT-LTF has been received (block 360), the matrix $\Delta W$ may be computed (block 364), and the matrix W may be calculated based on $W_{ltf}$ and $\Delta W$ (e.g., $W = P_1^{-1}(W_{ltf} = \Delta W)$) (block 368). For example, a value u may be calculated according to Equation 24, where $W_{ltf}$ is retrieved from the W memory and $h_4$ corresponds to the received fourth HT-LTF. A value k may be calculated according to Equation 23. Then, a value u' may be calculated as:

$$u' = ku \quad \text{(Equation 27)}$$

Next, $\Delta W$ may be calculated as:

$$\Delta W = u'w \quad \text{(Equation 28)}$$

where w is calculated according to Equation 25. After W is calculated based on $W_{ltf}$ and $\Delta W$, W may be stored in the W memory.

After a first data symbol is received (block 372), the matrix W may be retrieved from the W memory, and the norm of each row of the matrix W may be calculated in order to generate the matrix $W_{ii}$ (block 376). Then, the matrix $W_{ii}$ may be stored in the W memory. At a block 380, the matrix W may be applied to the received signal y:

$$z = Wy \quad \text{(Equation 29)}$$

At a block 384, the matrix $W_{ii}$ may be applied to the vector z to generate the equalized vector:

$$\hat{x} = W_{ii}zd \quad \text{(Equation 30)}$$

After each subsequent symbol is received, the blocks 380 and 384 may be repeated. If channel tracking is to be utilized, the matrix W may be adjusted as each data symbol is received or after some number of data symbols has been received. After adjustment, the matrix W may be stored in the W memory. Optionally, each time the matrix W is adjusted, the matrix $W_{ii}$ may be recalculated and stored in the W memory. Alternatively, the matrix $W_{ii}$ may be recalculated less frequently than the matrix W is adjusted. As yet another alternative, the matrix $W_{ii}$ need not be recalculated as the matrix W is adjusted.

Matrix equalizer computation and/or application methods such as those described above may be implemented by a matrix equalizer block such as the blocks 25, 35 of FIG. 1 and/or the MEQ 122 of FIG. 2. These methods may be implemented at least partially in hardware. Portions not implemented in hardware may be implemented in software and/or firmware. Alternatively, the methods may be implemented wholly in software. If any portion is implemented in software, the matrix equalizer block may include a processor (e.g., a general purpose processor, a special purpose processor such as a digital signal processor, etc.) and a memory coupled to the processor. The memory may store machine readable instructions that cause the processor to implement various portions of the method.

Matrix equalizer computation and/or application techniques such as described above may be utilized in various MIMO devices. For example, techniques such as described above may be utilized in base stations, access points, wireless routers, etc. Additionally, FIGS. 6A-6F illustrate various devices in which matrix equalizer computation and/or application techniques such as described above, may be employed.

Figure 6A:
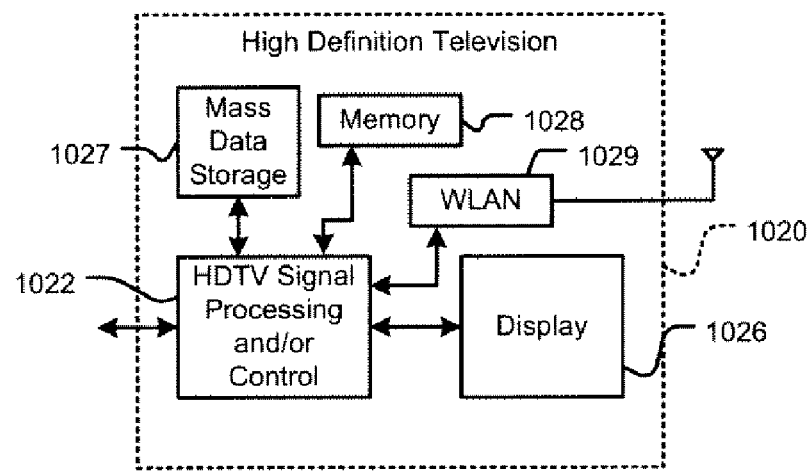
FIG. 6A is a block diagram of a high definition television that may utilize matrix equalizer computation and/or application techniques such as described herein.

Referring now to FIG. 6A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required. The signal processing and/or control circuit 1022 may implement matrix equalizer computation and/or application techniques such as described above.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement matrix equalizer computation and/or application techniques such as described above.

Figure 6B:
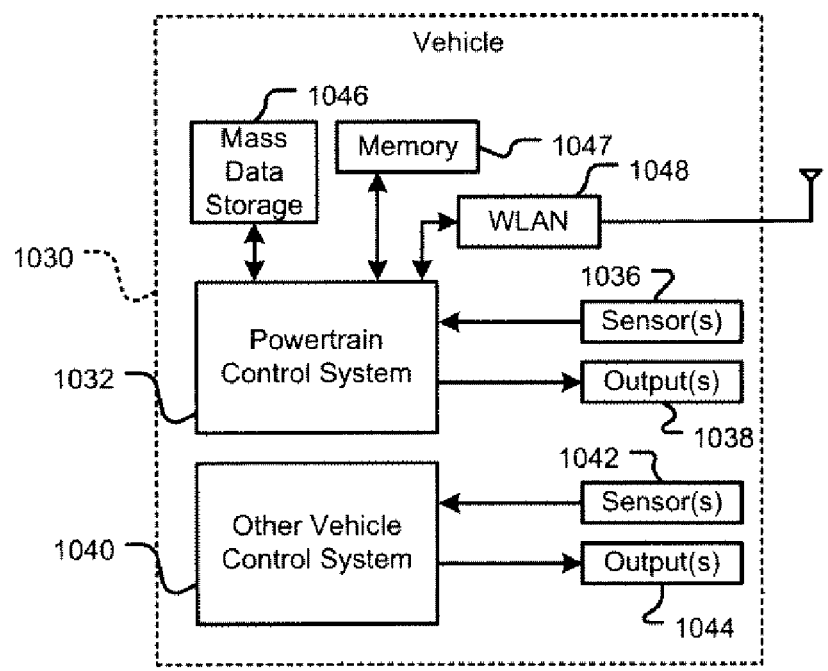
FIG. 6B is a block diagram of a vehicle that may utilize matrix equalizer computation and/or application techniques such as described herein.

Referring now to FIG. 6B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement matrix equalizer computation and/or application techniques such as described above.

Figure 6C:
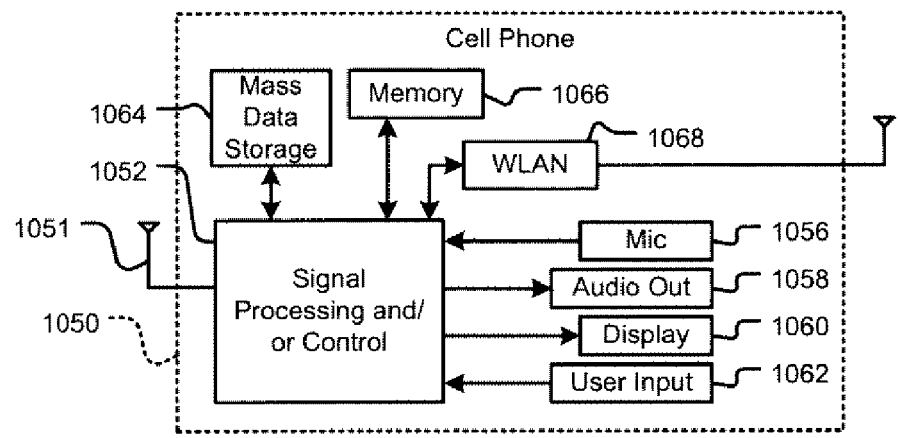
FIG. 6C is a block diagram of a cellular phone that may utilize matrix equalizer computation and/or application techniques such as described herein.

Referring now to FIG. 6C, such techniques may be used in a cellular phone 1050 that may include a cellular antenna 1051. The cellular phone 1050 may include either or both signal processing and/or control circuits, which are generally identified in FIG. 6C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions. The signal processing and/or control circuits 1052 may implement matrix equalizer computation and/or application techniques such as described above.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement matrix equalizer computation and/or application techniques such as described above.

Figure 6D:
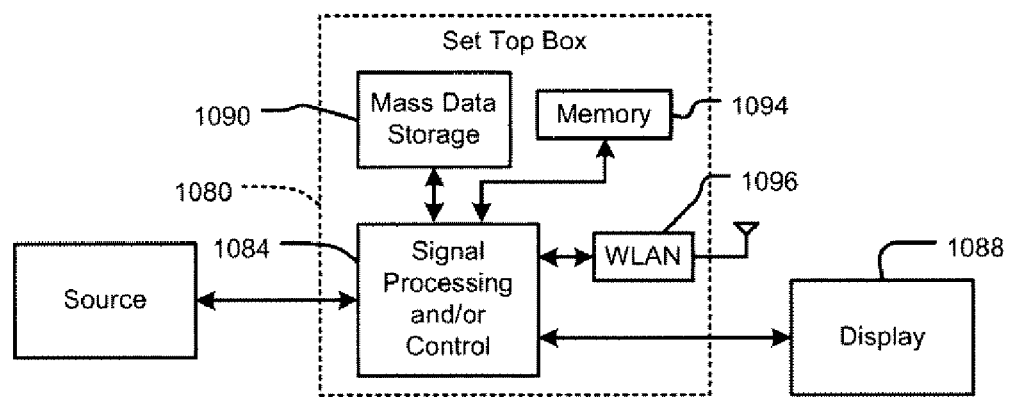
FIG. 6D is a block diagram of a set top box that may utilize matrix equalizer computation and/or application techniques such as described herein.

Referring now to FIG. 6D, such techniques may be utilized in a set top box 1080. The set top box 1080 may include either or both signal processing and/or control circuits, which are generally identified in FIG. 6D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function. The signal processing and/or control circuits 1084 may implement matrix equalizer computation and/or application techniques such as described above.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement matrix equalizer computation and/or application techniques such as described above.

Figure 6E:
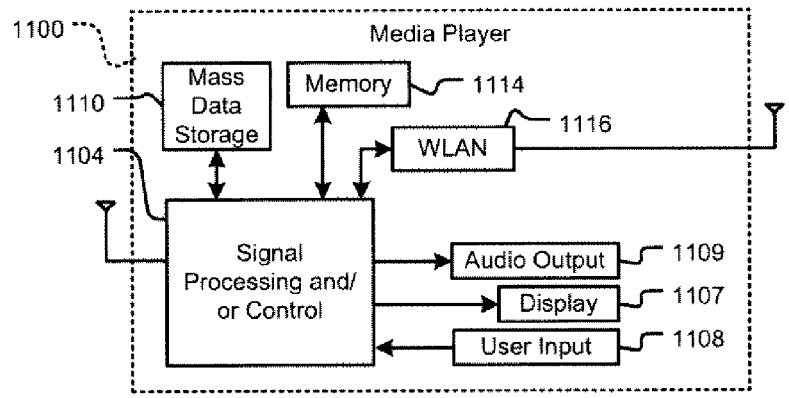
FIG. 6E is a block diagram of a media player that may utilize matrix equalizer computation and/or application techniques such as described herein.

Referring now to FIG. 6E, such techniques may be used in a media player 1100. The media player 1100 may include either or both signal processing and/or control circuits, which are generally identified in FIG. 6E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement matrix equalizer computation and/or application techniques such as described above.

Figure 6F:
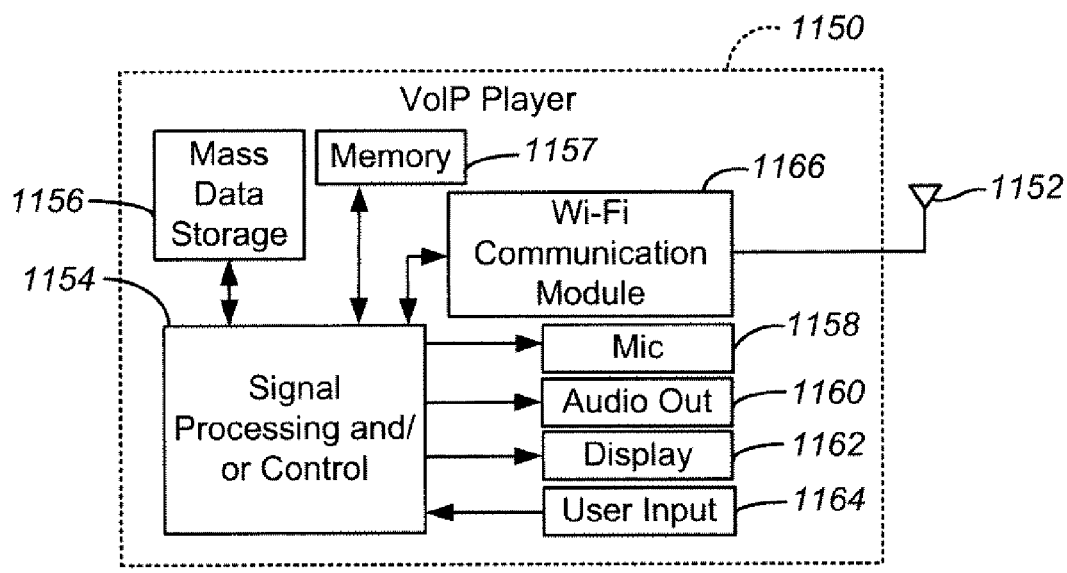
FIG. 6F is a block diagram of a voice over IP device that may utilize matrix equalizer computation and/or application techniques such as described herein.

Referring to FIG. 6F, such techniques may be utilized in a Voice over Internet Protocol (VoIP) phone 1150 that may include an antenna 1152. The VoIP phone 1150 may include either or both signal processing and/or control circuits, which are generally identified in FIG. 6F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement matrix equalizer computation and/or application techniques such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
   receiving a training signal;
   determining a channel estimate matrix based on the received training signal;
   partitioning the channel estimate matrix into a matrix [A B], wherein A is a block matrix having a row dimension of at least three and a column dimension less than the row dimension of block matrix A, and wherein B is a block matrix having a row dimension of at least three and a column dimension less than the row dimension of the block matrix B, and wherein at least one of the block matrices A and B contains elements corresponding to more than one receive and/or more than one transmit antenna;
   calculating a multiple input, multiple output (MIMO) equalizer based on a block matrix inverse or pseudoinverse of the partitioned channel estimate matrix, wherein calculating the MIMO equalizer comprises:
calculating $P_A^\perp = I - A(A^T A)^{-1} A^T$,
calculating $P_B^\perp = I - B(B^T B)^{-1} B^T$,
calculating $P_A^\perp B$,
calculating $P_B^\perp A$,
calculating $(P_A^\perp B)^+$, and
calculating $(P_B^\perp A)^+$,
wherein I is an identity matrix, and
$P_A^\perp$ and $P_B^\perp$ are orthogonal projection matrices; and
applying the MIMO equalizer to data signals.

2. The method of claim 1, wherein partitioning the channel estimate matrix into the matrix [A B] comprises partitioning the channel estimate matrix into a matrix [a b], wherein a is a vector having three rows, and wherein b is a vector having three rows.

3. The method of claim 2, wherein calculating the MIMO equalizer comprises:
calculating $$\bar{a} - \frac{\bar{b}}{\|b\|^2} c,$$

and
calculating $$\bar{b} - \frac{\bar{a}}{\|a\|^2} c,$$

wherein $\bar{a}$ is a transpose of a, $\bar{b}$ is a transpose of b, and c=b*a.

4. The method of claim 1, further comprising adjusting the MIMO equalizer during reception of a packet, and wherein applying the MIMO equalizer to data signals comprises:
applying the MIMO equalizer to one or more symbols in the packet prior to adjusting the MIMO equalizer; and
applying the MIMO equalizer to one or more additional symbols in the packet after adjusting the MIMO equalizer.

5. A method, comprising:
receiving a training signal;
determining a channel estimate matrix based on the received training signal;
partitioning the channel estimate matrix into a matrix $$\begin{bmatrix} A & B \\ C & D \end{bmatrix},$$

wherein A, B, C, and D are block matrices, and A has a row dimension of at least two and a column dimension of at least two, and wherein at least one of the block matrices A, B, C, and D contains elements corresponding to more than one receive and/or more than one transmit antenna;
calculating a multiple input, multiple output (MIMO) equalizer based on a block matrix inverse or pseudo-inverse of the partitioned channel estimate matrix, wherein calculating the MIMO equalizer comprises:
calculating $A^{-1} + A^{-1} B S_A^{-1} C A^{-1}$,
calculating $-A^{-1} B S_A^{-1}$,
calculating $-S_A^{-1} C A^{-1}$,
calculating $S_A^{-1}$,
wherein $S_A = D - C A^{-1} B$; and
applying the MIMO equalizer to data signals.

6. The method of claim 5, wherein A is a 2×2 matrix, B is 2×1 vector, C is 1×2 vector, D is a scalar;
wherein calculating the MIMO equalizer comprises calculating $A^{-1}$ prior to receiving a third high throughput long training field (HT-LTF).

7. The method of claim 6, wherein calculating the MIMO equalizer comprises calculating and storing a matrix $$\begin{bmatrix} A^{-1} & -A^{-1} \\ -CA^{-1} & 0 \end{bmatrix}$$

prior to receiving the third HT-LTF.

8. The method of claim 5, further comprising adjusting the MIMO equalizer during reception of a packet, and wherein applying the MIMO equalizer to data signals comprises:
applying the MIMO equalizer to one or more symbols in the packet prior to adjusting the MIMO equalizer; and
applying the MIMO equalizer to one or more additional symbols in the packet after adjusting the MIMO equalizer.

9. An apparatus for a multiple input, multiple output (MIMO) receiver, comprising:
a matrix equalizer configured to:
determine a channel estimate matrix based on a training signal;
partition the channel estimate matrix into a matrix [A B], wherein A is a block matrix having a row dimension of at least three and a column dimension less than the row dimension of block matrix A, and wherein B is a block matrix having a row dimension of at least three and a column dimension less than the row dimension of the block matrix B, wherein at least one of the block matrices A and B contains elements corresponding to more than one receive and/or more than one transmit antenna;
calculate a MIMO equalizer based on a block matrix inverse or pseudo-inverse of the partitioned channel estimate matrix, wherein calculating the MIMO equalized comprises:
calculating $P_A^\perp = I - A(A^T A)^{-1} A^T$,
calculating $P_B^\perp = I - B(B^T B)^{-1} B^T$,
calculating $P_A^\perp B$,
calculating $P_B^\perp A$,
calculating $(P_A^\perp B)^+$, and
calculating $(P_B^\perp A)^+$,
wherein I is an identity matrix, and
$P_A^\perp$ and $P_B^\perp$ are orthogonal projection matrices; and
apply the MIMO equalizer to data signals.

10. The apparatus of claim 9, wherein partitioning the channel estimate matrix into the matrix [A B] comprises partitioning the channel estimate matrix into a matrix [a b], wherein a is a vector having three rows, and wherein b is a vector having three rows.

11. The apparatus of claim 10, wherein the matrix equalizer is configured to:
calculate $$\bar{a} - \frac{\bar{b}}{\|b\|^2} c,$$

and
calculate $$\bar{b} - \frac{\bar{a}}{\|a\|^2}c,$$

wherein $\bar{a}$ is a transpose of a, $\bar{b}$ is a transpose of b, and c=b*a.

12. The apparatus of claim 9, further comprising a matrix equalizer update block coupled to the matrix equalizer;
wherein matrix equalizer update block is configured to generate a plurality of adjustments to the MIMO equalizer during reception of a packet; and
wherein the matrix equalizer is configured to:
apply the MIMO equalizer to one or more symbols in the packet after each adjustment to the MIMO equalizer.

13. An apparatus for a multiple input, multiple output (MIMO) receiver, comprising:
a matrix equalizer configured to:
determine a channel estimate matrix based on a training signal;
partition the channel estimate matrix $$\begin{bmatrix} A & B \\ C & D \end{bmatrix},$$

into a matrix wherein A, B, C, and D are block matrices, and A has a row dimension of at least two and a column dimension of at least two, wherein at least one of the block matrices A, B, C, and D contains elements corresponding to more than one receive and/or more than one transmit antenna;
calculate a MIMO equalizer based on a block matrix inverse or pseudo-inverse of the partitioned channel estimate matrix, wherein calculating the MIMO equalized comprises:
calculating $A^{-1}+A^{-1}BS_A^{-1}CA^{-1}$,
calculating $-A^{-1}BS_A^{-1}$,
calculating $-S_A^{-1}CA^{-1}$,
calculating $S_A^{-1}$,
wherein $S_A=D-CA^{-1}B$; and
apply the MIMO equalizer to data signals.

14. The apparatus of claim 13, wherein A is a 2×2 matrix, B is 2×1 vector, C is 1×2 vector, D is a scalar;
wherein the matrix equalizer is configured to calculate $A^{-1}$ prior to receiving a third high throughput long training field (HT-LTF).

15. The apparatus of claim 14, wherein the matrix equalizer comprises a memory;
wherein the matrix equalizer is configured to calculate and store in the memory a matrix $$\begin{bmatrix} A^{-1} & -A^{-1} \\ -CA^{-1} & 0 \end{bmatrix}$$

prior to receiving the third HT-LTF.

16. The apparatus of claim 13, further comprising a matrix equalizer update block coupled to the matrix equalizer;
wherein matrix equalizer update block is configured to generate a plurality of adjustments to the MIMO equalizer during reception of a packet; and
wherein the matrix equalizer is configured to:
apply the MIMO equalizer to one or more symbols in the packet after each adjustment to the MIMO equalizer.

17. A method of wirelessly receiving signals in a multiple input, multiple output (MIMO) communication system having a receiver with a plurality of receive antennas and a transmitter with a plurality of transmit antennas, the method comprising:
receiving a training signal;
demodulating the training signal to produce a demodulated training signal;
determining a channel estimate matrix based on the demodulated training signal;
partitioning the channel estimate matrix into a matrix [A B], wherein A is a block matrix having a row dimension of at least three and a column dimension less than the row dimension of block matrix A, and wherein B is a block matrix having a row dimension of at least three and a column dimension less than the row dimension of the block matrix B, and wherein at least one of the block matrices A and B contains elements corresponding to more than one receive and/or more than one transmit antenna;
calculating a multiple input, multiple output (MIMO) equalizer based on a block matrix inverse or pseudo-inverse of the partitioned channel estimate matrix, wherein calculating the MIMO equalizer comprises:
calculating $P_A^\perp = I - A(A^TA)^{-1}A^T$,
calculating $P_B^\perp = I - B(B^TB)^{-1}B^T$,
calculating $P_A^\perp B$,
calculating $P_B^\perp A$,
calculating $(P_A^\perp B)^+$, and
calculating $(P_B^\perp A)^+$,
wherein I is an identity matrix, and
$P_A^\perp$ and $P_B^\perp$ are orthogonal projection matrices;
receiving a data signal;
demodulating the data signal to produce a demodulated data signal;
applying the MIMO equalizer to the demodulated data signal to produce an equalized data signal; and
decoding the equalized data signal.

18. The method of claim 17, further comprising adjusting the MIMO equalizer during reception of a packet, and wherein applying the MIMO equalizer to the demodulated data signal comprises:
applying the MIMO equalizer to one or more symbols in the packet prior to adjusting the MIMO equalizer; and
applying the MIMO equalizer to one or more additional symbols in the packet after adjusting the MIMO equalizer.

19. A wireless receiver for receiving signals in a multiple input, multiple output (MIMO) communication system, the wireless receiver comprising:
a plurality of receive antennas;
a signal demodulator coupled to the plurality of receive antennas and adapted to demodulate signals received via the plurality of receive antennas to produce a demodulated signal;
a matrix equalizer coupled to the signal demodulator to generate an equalized signal; and
a decoder coupled to the matrix equalizer and adapted to decode the equalized signal;
where the matrix equalizer is configured to:
determine a channel estimate matrix based on a demodulated training signal;
partition the channel estimate matrix into a matrix [A B], wherein A is a block matrix having a row dimension of at least three and a column dimension less than the row dimension of block matrix A, and wherein B is a block matrix having a row dimension of at least three and a column dimension less than the row dimension of the block matrix B, wherein at least one of the block matrices A and B contains elements corresponding to more than one receive and/or more than one transmit antenna;

calculate a MIMO equalizer based on a block matrix inverse or pseudo-inverse of the partitioned channel estimate matrix, wherein calculating the MIMO equalized comprises:

calculating $P_A^\perp = I - A(A^T A)^{-1} A^T$, calculating $P_B^\perp = I - B(B^T B)^{-1} B^T$, calculating $P_A^\perp B$, calculating $P_B^\perp A$, calculating $(P_A^\perp B)^+$, and calculating $(P_B^\perp A)^+$, wherein I is an identity matrix, and $P_A^\perp$ and $P_B^\perp$ are orthogonal projection matrices.

20. The wireless receiver of claim 19, further comprising a matrix equalizer update block coupled to the matrix equalizer and coupled to the decoder;

wherein matrix equalizer update block is configured to generate a plurality of adjustments to the MIMO equalizer during reception of a packet based on output of the decoder; and wherein the matrix equalizer is configured to apply the MIMO equalizer to one or more symbols in the packet after each adjustment to the MIMO equalizer.

* * * * *